(12) United States Patent
Nylander et al.

(10) Patent No.: US 10,939,330 B2
(45) Date of Patent: Mar. 2, 2021

(54) ESTABLISHING AN INTERACTION SESSION ON A BEARER IN A RADIO COMMUNICATION NETWORK

(71) Applicant: Telefonaktiebolaget LM Ericsson (publ), Stockholm (SE)

(72) Inventors: Tomas Nylander, Värmdö (SE); Ann-Christine Eriksson, Enköping (SE); Jari Vikberg, Järna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 191 days.

(21) Appl. No.: 15/772,524

(22) PCT Filed: Nov. 3, 2015

(86) PCT No.: PCT/SE2015/051159
§ 371 (c)(1),
(2) Date: Apr. 30, 2018

(87) PCT Pub. No.: WO2017/078581
PCT Pub. Date: May 11, 2017

(65) Prior Publication Data
US 2019/0082361 A1    Mar. 14, 2019

(51) Int. Cl.
*H04W 36/00* (2009.01)
*H04L 29/08* (2006.01)
(Continued)

(52) U.S. Cl.
CPC ......... *H04W 36/0022* (2013.01); *H04L 12/66* (2013.01); *H04L 29/06* (2013.01);
(Continued)

(58) Field of Classification Search
CPC ....... H04L 12/66; H04L 29/06; H04L 67/141; H04L 69/164; H04M 15/66;
(Continued)

(56) References Cited

U.S. PATENT DOCUMENTS

| 2014/0148158 A1* | 5/2014 | Cho ...................... H04W 28/14 455/435.1 |
| 2014/0219248 A1* | 8/2014 | Reddiboyana ........ H04W 76/15 370/331 |

(Continued)

FOREIGN PATENT DOCUMENTS

| EP | 2908591 A1 | 8/2015 |
| WO | 2013188105 A1 | 12/2013 |

(Continued)

OTHER PUBLICATIONS

Extended European Search Report for Application No. 15907897.1, dated Jun. 4, 2019, 10 pages.

(Continued)

*Primary Examiner* — Asad M Nawaz
*Assistant Examiner* — Zhaohui Yang
(74) *Attorney, Agent, or Firm* — NDWE LLP

(57) ABSTRACT

A method performed in an Interaction Gateway (IGW) located between a Packet Data Network (PDN) and a user plane gateway of a communication network used by a service client for service level communication with a service provider, in which communication network there is a first and a second communication bearer between a radio device, comprising the service client, and the user plane gateway via a Radio Access Network (RAN). The second communication bearer is associated with the service level communication. The method is for establishing an interaction session on the second communication bearer between the IGW and the service client for controlling the service level communication.

15 Claims, 8 Drawing Sheets

(51) Int. Cl.
| | |
|---|---|
| *H04W 28/02* | (2009.01) |
| *H04W 76/12* | (2018.01) |
| *H04L 29/06* | (2006.01) |
| *H04W 4/20* | (2018.01) |
| *H04L 12/66* | (2006.01) |
| *H04M 15/00* | (2006.01) |
| *H04W 88/16* | (2009.01) |
| *H04W 48/00* | (2009.01) |
| *H04W 76/22* | (2018.01) |

(52) U.S. Cl.
CPC .......... *H04L 67/141* (2013.01); *H04L 69/164* (2013.01); *H04M 15/66* (2013.01); *H04W 4/20* (2013.01); *H04W 28/0263* (2013.01); *H04W 76/12* (2018.02); *H04W 88/16* (2013.01); *H04W 28/0268* (2013.01); *H04W 48/17* (2013.01); *H04W 76/22* (2018.02)

(58) Field of Classification Search
CPC ......... H04W 28/0263; H04W 28/0268; H04W 36/0022; H04W 48/17; H04W 4/20; H04W 76/12; H04W 76/22; H04W 88/16
See application file for complete search history.

(56) References Cited

U.S. PATENT DOCUMENTS

| | | | |
|---|---|---|---|
| 2014/0341039 A1 | 11/2014 | Rubin et al. | |
| 2016/0135219 A1* | 5/2016 | Jain | H04W 40/06 370/329 |
| 2016/0360458 A1* | 12/2016 | Lubenski | H04W 76/22 |

FOREIGN PATENT DOCUMENTS

| | | |
|---|---|---|
| WO | 2014191053 A1 | 12/2014 |
| WO | 2014207712 A1 | 12/2014 |
| WO | 2016200297 A1 | 12/2016 |

OTHER PUBLICATIONS

International Preliminary Report on Patentability for Application No. PCT/SE2015/051159, dated May 17, 2018, 9 pages.

International Search Report and Written Opinion for International Application No. PCT/SE2015/051159, dated Jun. 23, 2016, 12 pages.

3GPP TS 23.401, "3rd Generation Partnership Project; Technical Specification Group Services and System Aspects; General Packet Radio Service (GPRS) enhancements for Evolved Universal Terrestrial Radio Access Network (E-UTRAN) access (Release 13)," Sep. 2015, 334 pages, V13.4.0, 3GPP Organizational Partners.

3GPP TS 36.300, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," Sep. 2015, 254 pages, V13.1.0, 3GPP Organizational Partners.

Communication under to Rule 71(3) EPC for EP Application No. 15907897.1, dated Feb. 20, 2020, 108 pages.

Decision to Grant for EP Application No. 15907897.1, dated Apr. 9, 2020, 2 pages.

\* cited by examiner

ESTABLISHING AN INTERACTION SESSION ON A BEARER IN A RADIO COMMUNICATION NETWORK

CROSS-REFERENCE TO RELATED APPLICATIONS

This application is a National stage of International Application No. PCT/SE2015/051159, filed Nov. 3, 2015, which is hereby incorporated by reference.

TECHNICAL FIELD

The present disclosure relates to methods and devices for establishing a communication session between a service client in a radio device and gateway via a Radio Access Network (RAN) in a communication network.

BACKGROUND

FIG. 1 is a simplified network illustration. The App x and App y in the User Equipment (UE) communicates with their respective server located on the Internet via the mobile operators Radio Access Network (RAN), Core Network (CN) and service network. To take Adaptive Bit Rate as an example, for this feature the video server has the video encoded in different bitrates, and the UE selects the format based on throughput estimations. End user experience or Quality of Experience (QoE) is a differentiator for mobile operators and internet service providers. Applications are attempting to be adaptive to ensure a good QoE, e.g. by adapting to varying throughput by changing to an encoded format with a suitable bitrate. Currently this is done by trying to estimate the throughput between the server and the application (app) in the UE, e.g. based on measured link bit rate or round trip times (RTT). How frequently the bitrate can be changed varies. A typical interval for adaptive video streaming would be every 2-5 seconds.

FIG. 2 is a schematic diagram of Evolved Packet Core (EPC) architecture (non-roaming) for access to a cellular network in accordance with a Third Generation Partnership Project (3GPP) standard. Evolved Packet System (EPS) is the Evolved 3GPP Packet Switched Domain and consists of EPC and an Evolved Universal Terrestrial Radio Access Network (E-UTRAN). The architecture is defined in 3GPP Technical Specification (TS) 23.401, which also defines the Packet Data Network (PDN) Gateway PGW, the Serving Gateway (SGW), the Policy and Charging Rules Function (PCRF), the Mobility Management Entity (MME) and the user equipment (UE, a radio device e.g. a mobile phone). The Long Term Evolution (LTE) radio access network, E-UTRAN, comprises one or more base stations called evolved Node B (eNB).

The overall E-UTRAN architecture is further defined in for example 3GPP TS 36.300. The E-UTRAN comprises eNBs providing the E-UTRAN user plane (radio interface user plane layers such as Packet Data Convergence Protocol (PDCP), Radio Link Control (RLC), Media Access Control (MAC) and physical layer (PHY)) and control plane (Radio Resource Control, RRC, in addition to the above user plane protocol layers) protocol terminations towards the UE. The eNBs are interconnected with each other over the X2 interface. The eNBs are also connected by means of the S1 interface to the EPC, more specifically to the MME over the S1-MME interface and to the SGW over the S1-U interface.

A new RAN feature has been specified in 3GPP for LTE in Release 12 (Rel-12). It is called LTE Dual Connectivity (DC). As the name implies it means that a UE can be connected to multiple eNBs at the same time, i.e. send and receive data on multiple paths. E-UTRAN supports DC operation whereby a UE comprising multiple receivers and transmitters (RX/TX) in RRC_CONNECTED state is configured to utilise radio resources provided by two distinct schedulers, located in two different eNBs connected via a non-ideal backhaul over the X2 interface.

In the DC solution, concepts of Master eNB (MeNB) and Secondary eNB (SeNB) are introduced. eNBs involved in dual connectivity for a certain UE may assume two different roles: an eNB may either act as an MeNB or as an SeNB. In dual connectivity, a UE is connected to one MeNB and one SeNB.

In DC, the radio protocol architecture that a particular bearer uses depends on how the bearer is setup. Three alternatives exist, Master Cell Group (MCG) bearer, Secondary Cell Group (SCG) bearer and split bearer.

For MCG bearers, the MeNB is user plane connected to the SGW via S1-U, the SeNB is not involved in the transport of user plane data.

For split bearers, the MeNB is user plane connected to the SGW via S1-U and in addition the MeNB and the SeNB are interconnected via X2.

For SCG bearers, the SeNB is directly connected with the SGW via S1-U.

In 3GPP, Quality of Service (QoS) is managed on a per bearer level from the CN. The RAN is responsible for setting up the radio bearers, radio resource management, and enforcing QoS according to the bearer QoS Profile—over the radio (e.g. LTE-Uu) interface in the downlink (DL) and over the transport network in the uplink (UL). The architectures differ slightly over the different radio access networks (e.g. 3G/Wideband Code Division Multiple Access (WCDMA) and 4G/LTE) but the QoS principles are similar (at least for 3G and 4G networks). FIG. 3 shows the EPS bearer architecture and the different levels of bearers building up the end-to-end connection for the UE.

3GPP defines the concept of a PDN. A PDN is in most cases an IP network, e.g. Internet or an operator IP Multimedia Subsystem (IMS) service network. A PDN has one or more names. Each name is defined in a string called Access Point Name (APN). The PGW is a gateway towards one or more PDNs. A UE may have one or more PDN connections. A PDN connection is a logical IP tunnel between UE and PGW, providing the UE access to a PDN. The setup of a PDN connection is initiated from the UE.

Every PDN connection consists of one or more EPS bearers. See 3GPP TS 23.401 section 4.7.2 for a description of the bearer concept. A bearer uniquely identifies traffic flows that receive a common QoS treatment between a UE and a PGW. Each bearer on a particular access has a unique bearer ID. On the 3GPP access, the bearer is end-to-end between UE and PGW. Every PDN connection has at least one bearer and this bearer is called the default bearer. All additional bearers on the PDN connection are called dedicated bearers.

A bearer carries traffic in the form of IP packets. Which traffic is carried on a bearer is defined by filters. A filter is an n-tuple where each element in the tuple contains a value, a range, or a wildcard. An n-tuple is also known as an IP flow. An example of a 5-tuple is (dst IP=83.50.20.110, src IP=145.45.68.201, dst port=80, src port=*, prot=TCP). This 5-tuple defines a source (src) and destination (dst) IP address, a source and destination port, and a protocol.

The source port is a wildcard. Traffic matching this 5-tuple filter would be all Transmission Control Protocol (TCP) traffic from IP=145.45.68.201 to IP=83.50.20.110 and port=80.

A traffic flow template (TFT) contains one or more filters. Every bearer has a TFT. One bearer within a PDN connection and access may lack an explicit TFT (this bearer is typically the default bearer). Implicitly such a bearer has a TFT with a single filter matching all packets.

Bearers are used for example to provide different quality of service and characteristics. When a UE is active it has a default bearer where all traffic goes. The network or the UE can initiate a secondary/dedicated bearer with a different quality/characteristics. The network can detect a flow that should have a dedicated bearer by inspecting the traffic, or the network can be informed by an Application Function (AF). An entity in the operators IP services, or the network can be informed for example by the UE about the need for a dedicated bearer. For example, if a video session is detected, the network then could trigger the establishment of a new bearer, apply a filter to separate which traffic should go on which bearer, i.e. the TFT. This TFT is also sent to the UE so that the UE can put uplink (UL) traffic on the correct bearer. In downlink (DL), TFTs are used to map/select which transport tunnel (GTP tunnel) and bearer a certain flow should be sent on. A TFT may comprise any of the following identifiers:

Source Address and Subnet Mask
Protocol Number (IPv4)/Next Header (IPv6)
Destination Port Range
Source Port Range
IPsec SPI
TOS (IPv4)/Traffic Class (IPv6) and Mask
Flow Label (IPv6)

For example, the PGW will, when receiving an Internet Protocol (IP) packet from the Internet with a destination IP address, select a UE context based on the destination IP address. This means that the UE context is identified with a UE IP address and contains a number of TFTs associated with each dedicated bearer established for the UE. The PGW then checks if there is a TFT associated with information included in the received IP packet in the UE context and tries to match the received IP packet with the TFT, and if there is a match send the packet on the dedicated bearer associated with that TFT. Similarly for the UE, when an UL packet is sent from the higher layer parts of the UE, e.g. an app, and received by the lower layer of the UE, e.g. where the radio protocols reside, there is a check if there is a TFT that matches and if there is match then the UL packet is sent on the dedicated bearer associated with that TFT.

SUMMARY

The present disclosure is related to providing new functionality in existing (2G, 3G, 4G etc.) and future (5G, 6G, etc.) radio communication networks. The area of functionality comprises interactions between the service domain and an interaction gateway (IGW), and optionally further to the RAN domain, for example between an app (acting as a service client) running on a radio device and the IGW, and optionally further between the IGW and a RAN node such as an eNB.

Service applications are attempting to be adaptive to ensure a good QoE, e.g. by adapting to varying throughputs by changing the bit rate or resolution of a streaming video and/or audio to avoid freezing of the play-out. Currently, this is done by trying to estimate the throughput between server and application in the radio device, e.g. based on measured link bit rate or round trip times (RTT). The estimation is typically performed by the application in the radio device, i.e. the service client (herein also called "client"). An interface between the mobile network and the client could be used to convey information that can be used to enhance service delivery and QoE.

It would be convenient to provide interaction between the service client in the radio device and the IGW, and optionally further to the RAN, based on user plane communication. However, if dedicated bearers are used to deliver the service in question, the interaction communication should preferably be possible to relate to the dedicated bearer of the service, since for example the achievable bitrate may depend on the priority of the bearer.

It may be possible to improve the throughput estimations by having network (NW) interaction with the clients, e.g. in accordance with the architecture illustrated in FIG. 4. The new functionality called an Interaction Gateway (IGW) is introduced in the network side for the communication towards (different parts of) a connected radio device. An I1-interface is introduced between the radio device and the Interaction Gateway. In addition, the Interaction Gateway may have another interface, called an I2-interface, towards the RAN depending on the position of the Interaction Gateway. The Interaction Gateway can be placed either in the RAN or at the SGi interface (see FIG. 4). In the following, it is assumed that the IGW is at the SGi interface.

In the case of FIG. 4, the signalling from the application in the radio device (e.g. a UE) to the RAN uses first an I1 session over the I1-interface between radio device and the IGW (that is placed at the SGi-interface), also through the RAN. The IGW then forwards the communication to the RAN in an I2 session over the I2-interface. All replies from the RAN to the radio device may take the same path in opposite direction i.e. first I2-interface from the RAN to the IGW and then from the IGW to the radio device using the I1-interface (also through the RAN).

Both the I1- and I2-interfaces may be defined being based on user plane traffic. They may for example be User Datagram Protocol (UDP)/IP-based so that the client in the radio device is able to send and receive interaction messages. When the IGW is placed at the SGi interface, the radio device may address the IGW directly using an IP-address.

For the I2 session from the IGW to the RAN, the signalling uses the IP address of the radio device as the destination address and an IGW IP address as the source address (and vice versa in the uplink direction). A single IGW IP address may be used by the RAN nodes in one operators network for interaction, this simplifies Operations and Maintenance (O&M) and RAN handling. I.e. the presence of this IP address (i.e. the IGW IP address) is an indication of an interaction message over the I2-interface. There may be a need for the RAN nodes to identify I2-interface signalling separately from I1-interface signalling, i.e. I1-interface signalling goes transparently though the RAN but the I2-interface signalling should be terminated in the RAN. One solution for this purpose is to use different IGW IP addresses for these two different interfaces, for example IGW IP1 for the I1 interface and IGW IP2 for the I2-interface.

The client in the radio device may for example obtain an initial IGW IP address by a Domain Name System (DNS) lookup and use it for the initialization signalling over the I1 interface. For any consecutive I1 session signalling the IGW may indicate another IP address to be used (e.g. an IGW IP1 address). Additional measures may be needed in the RAN for the I2 session signalling since RAN does not normally terminate user plane traffic. Therefore, the RAN may perform "sniffing" of the downlink traffic to detect if a message is an interaction message of an I2 session or not (i.e. if source IP address is the IGW IP2 address). When an interaction message is identified in the downlink, it may be forwarded to the rest of the eNB logic (shown as "Function for Recommendation" in FIG. 4). eNB is here used as an example, but any other RAN node or base station may alternatively be used. When the eNB wants to send an interaction message to the radio device, it is injected in the uplink traffic by the RAN over the I2 interface using the radio device IP address as the source address and the IGW IP2 as the destination address. The IGW may then forward the information to the radio device in the I1 session using the IGW IP1 as the source address and the radio device IP address as the destination address. For the example use case of network assistance (which aims to improve QoE), the client in the radio device may send a Query message to the RAN node (via IGW at the SGi interface) asking for the available bitrate. This query is handled by the RAN node (e.g. an eNB), an achievable bit rate is estimated/predicted for the radio device and a response message is sent back to the radio device (via the IGW over the I2 and I1 interfaces). The achievable bitrate depends on a number of factors, e.g. number of radio devices in the cell that needs to share the capacity, the radio conditions of the radio device, and the priority for the bearer.

The user plane based interaction interfaces (I1 and I2) may have some issues if dedicated bearers are used and the radio device—NW interactions are related to the user plane session on the dedicated bearer. These issues are hereby exemplified:

a In the case of a radio device having both a default bearer and a dedicated bearer involving one RAN node, then when an I1 query message is sent from the upper layer in the radio device, that query will be sent on the default bearer since the default bearer carries all IP flows with no specific TFT filtering. This applies for both the I1- and I2-interfaces. The receiving RAN node receiving signalling over the I2 interface, e.g. an I2 query, cannot determine which bearer this query relates to and the subsequent bitrate recommendation will be done for the default bearer. If the query was related to the dedicated bearer, the recommendation will be incorrect.

b In the case of Dual Connectivity, then an I1 query message sent by the radio device on the default bearer may result in that the corresponding I2 query message even ends up in the wrong RAN node, e.g. if MCG bearer carries the default bearer, and SCG bearer carries the dedicated bearer.

c Also, if I1 and/or I2 messages are sent on another bearer than the service they are related to, different priorities may apply whereby there is a risk that for example I1/I2 interaction messages get a higher latency.

d In case there are several bearers with services that requires I1 and/or I2 interaction, for example if two applications in the radio device wants to use I1/I2 interaction for adaptive video, and they are on different bearers, then the I1/I2 interactions have to take place on the correct bearer.

Therefore it would be advantageous if the I1 and/or I2 interaction messages are sent on the same bearer that the interaction relates to, as in accordance with the present disclosure. It may be more important that the RAN node receives the I2 signalling on the correct dedicated bearer. However, there are some benefits from also having the I1 signalling on the correct dedicated bearer (since in this case also the I1 signalling will get the same QoS as the related service and the I2 signalling).

The present disclosure provides methods to ensure that the I1 and optionally any I2 interaction messages (of I1/I2 sessions over the I1/I2 interfaces) are sent on the same dedicated bearer as the related service of the client in the radio device is running on. The Interaction Gateway is placed at the SGi-interface, between the PDN and the user plane gateway, e.g. PGW, (logically, but physically possibly co-located with the PGW). Some general steps may be as follows:

The service client in the radio device may be in service level communication with a server of a service provider (e.g. on the Internet). This traffic is mapped on a dedicated bearer and "service level address" information is used for this communication.

The service client in the radio device triggers I1 initialization using the default bearer towards the IGW. This procedure is triggered towards an "I1 initial IGW address" information. The radio device also includes the service level address information in the I1 initialization message.

The IGW may select a termination UDP port and IP addresses for the I1 and/or I2 sessions.
  The address information used for I1 may be called "I1 session IGW address" information, comprising for example an IP address (here called IGW IP1 address) and the selected UDP port.
  The address information used for I2 may be called "I2 session IGW address" information comprising for example an IP address (here called IGW IP2 address) and the selected UDP port.

The IGW may communicate the service level address information, "I1 session IGW address" and "I2 session IGW address" to the PCRF to trigger the creation of new TFTs for the dedicated bearer as follows:
  the "I1 session IGW address" is added as both an UL TFT in the radio device for destination address information and as a DL TFT in the PGW for source address information, and
  the "I2 session IGW address" is added as a DL TFT in the PGW for source address information.

The installed TFTs ensure that the I1-interaction signalling using the "I1 session IGW address" is always on the dedicated bearer, and that the I2-interaction signalling in downlink using the "I2 session IGW address" is on the same dedicated bearer. The uplink part of the I2-interaction signalling may be put on the dedicated bearer using RAN-internal mechanisms (the RAN may remember on which bearer it received I2 communication and may respond on the same bearer).

The I2 session is herein presented as optional. The IGW may alternatively receive e.g. throughput estimations or bit rate recommendations from elsewhere in the communication network e.g. from a server on the Internet, instead of from the RAN.

According to an aspect of the present disclosure, there is provided a method performed in an IGW located between a Packet Data Network, PDN, (9) and a user plane gateway of a communication network used by a service client for service level communication with a service provider, in which communication network there is a first and a second communication bearer between a radio device, comprising the service client, and the user plane gateway via a RAN. The second communication bearer is associated with the service level communication. The method is for establishing a first interaction session on the second communication bearer between the IGW and the service client for controlling the service level communication. The method comprises obtaining an initialization message addressed to the IGW by means of default IGW address information via the first bearer, for initiating the first interaction session, the initialization message comprising service level address information used for the service level communication. The method also comprises determining first dedicated IGW address information for the first interaction session. The method also comprises initiating sending of a confirmation message comprising the determined first dedicated IGW address information to the service client. The method also comprises ensuring that the first interaction session, using the first dedicated IGW address information, is associated with the second communication bearer.

According to another aspect of the present disclosure, there is provided an IGW configured for being located between a PDN and a user plane gateway, e.g. PGW, of a communication network used by a service client for service level communication with a service provider, in which communication network there is a first and a second communication bearer between a radio device, comprising the service client, and the user plane gateway via a RAN where the second communication bearer is associated with the service level communication, for establishing a first interaction session on the second communication bearer between the IGW and the service client for controlling the service level communication. The IGW comprises processor circuitry, and storage storing instructions executable by said processor circuitry whereby said IGW is operative to obtain an initialization message addressed to the IGW by means of default IGW address information via the first bearer, for initiating the first interaction session. The initialization message comprises service level address information used for the service level communication. The IGW is also operative to determine first dedicated IGW address information for the first interaction session. The IGW is also operative to initiate sending of a confirmation message comprising the determined first dedicated IGW address information to the service client. The IGW is also operative to ensure that the first interaction session, using the first dedicated IGW address information, is associated with the second communication bearer used for the service level communication.

According to another aspect of the present disclosure, there is provided a method performed in a radio device, comprising a service client configured for service level communication with a service provider, connected to a RAN of a communication network in which there is a first and a second communication bearer between the radio device and a user plane gateway of the communication network via the RAN, where the second communication bearer is associated with the service level communication, for establishing a first interaction session between an IGW and the service client in the radio device on the second communication bearer for controlling the service level communication. The IGW is located between a PDN and the user plane gateway. The method comprises obtaining first dedicated IGW address information for the first interaction session. The method also comprises ensuring that the first interaction session, using the first dedicated IGW address information, is associated with the second communication bearer.

According to another aspect of the present disclosure, there is provided a radio device configured for being connected to a RAN of a communication network in which there is a first and a second communication bearer between the radio device and a user plane gateway of the communication network via the RAN, where the second communication bearer is associated with a service level communication between a service client in the radio device and a service provider, and for establishing a first interaction session between an IGW of the RAN and the service client on the second communication bearer for controlling the service level communication, wherein the IGW is located between a PDN and the user plane gateway. The radio device comprises processor circuitry, and storage storing instructions executable by said processor circuitry whereby said radio device is operative to obtain first dedicated IGW address information for the interaction session. The radio device is also operative to ensure that the first interaction session, using the first dedicated IGW address information, is associated with the second communication bearer.

According to another aspect of the present disclosure, there is provided a computer program product comprising computer-executable components for causing an IGW to perform an embodiment of a method of the present disclosure when the computer-executable components are run on processor circuitry comprised in the IGW.

According to another aspect of the present disclosure, there is provided a computer program product comprising computer-executable components for causing a radio device to perform an embodiment of a method of the present disclosure when the computer-executable components are run on processor circuitry comprised in the radio device.

According to another aspect of the present disclosure, there is provided a computer program for establishing a first interaction session between an IGW and a service client of a radio device for controlling service level communication between the service client and a service provider, wherein there is a first and a second communication bearer between the radio device and a user plane gateway via a RAN, where the second communication bearer is associated with the service level communication, wherein the IGW is located between a PDN and the user plane gateway. The computer program comprises computer program code which is able to, when run on processor circuitry of the IGW, cause the IGW to obtain an initialization message addressed to the IGW by means of default IGW address information via the first bearer, for initiating the first interaction session. The initialization message comprises service level address information 102 used for the service level communication. The code is also able to cause the IGW to determine first dedicated IGW address information for the interaction session. The code is also able to initiate sending of a confirmation message comprising the first determined dedicated IGW address information to the service client. The code is also able to cause the IGW to ensure that the first interaction session, using the first dedicated IGW address information, is associated with the second communication bearer.

According to another aspect of the present disclosure, there is provided a computer program for establishing a first interaction session between an IGW and service client of a radio device for controlling service level communication between the service client and a service provider, wherein there is a first and a second communication bearer between the radio device and a user plane gateway via a RAN, where the second communication bearer is associated with the service level communication, wherein the IGW is located between a Packet Data Network, PDN, (9) and the user plane gateway, the computer program comprising computer program code which is able to, when run on processor circuitry of the radio device, cause the radio device to obtain first dedicated IGW address information for the first interaction session. The code is also able to cause the radio device to ensure that the first interaction session, using the first dedicated IGW address information, is associated with the second communication bearer.

According to another aspect of the present disclosure, there is provided a computer program product comprising an embodiment of a computer program of the present disclosure and a computer readable means on which the computer program is stored.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

The IGW is in accordance with the present disclosure located (i.e. logically located, in a functional sense) between a PDN and a user plane gateway, e.g. a PGW.

The present disclosure relates to mapping client—IGW user plane interaction, I1 interaction, to the corresponding bearer that carries the service which the interaction relates to, and by that making it possible for the IGW to forward recommendations (e.g. from the RAN using the I2 interface) for a specific bearer, i.e. service. Additionally, the methods allow the IGW to forward multiple I1 recommendations, one per bearer.

The present disclosure provides methods to facilitate that interaction messages to and from the IGW will be sent on the dedicated bearer the interaction relates to. This is done by ensuring that TFT(s) including the IP addresses used to identify interaction messages in I1 and (optionally) I2 sessions are installed at the radio device and/or at the PGW.

Figure 5:
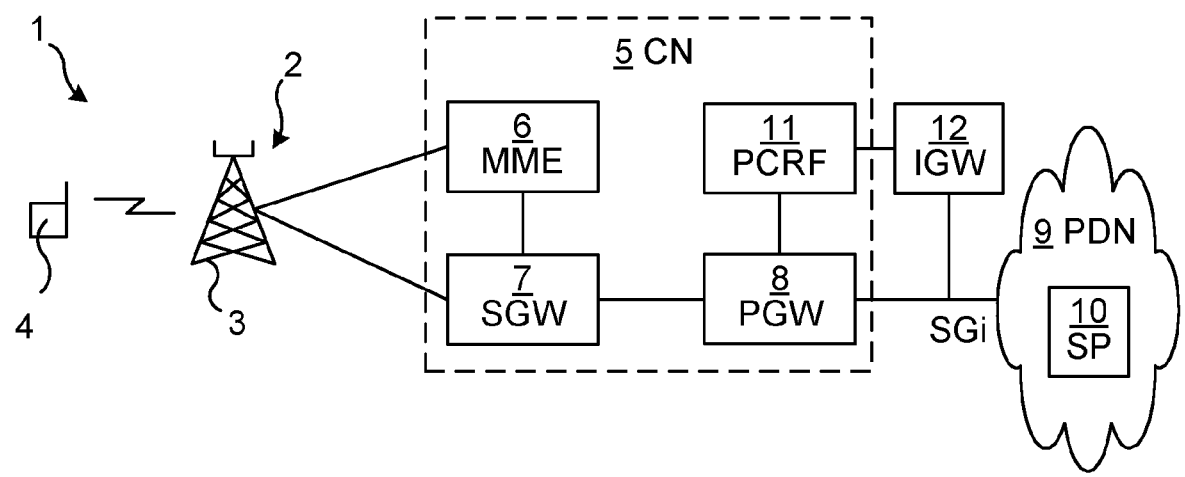
FIG. 5 is a schematic block diagram of an embodiment of a communication network in accordance with the present disclosure.

FIG. 5 is a schematic block diagram of a radio device 4 connected to a communication network 1. The communication network 1 comprises a RAN 2, typically a cellular RAN in accordance with a 3GPP standard, comprising one or a plurality of RAN nodes 3, e.g. evolved Node B (eNB) or Node B in combination with Radio Network Controller (RNC). The communication network 1 also comprises a CN 5 comprising an SGW 7 and a user plane gateway 8 in the form of a PGW, as well as an MME 6 and a PCRF 11, and any other standard CN nodes needed. Via the PGW, the communication network is connected, over the SGi interface, to the PDN 9, e.g. the Internet, in which a service provider (SP) 10 resides with one or a plurality of servers e.g. Content Delivery Network (CDN) servers. In accordance with the present disclosure, the communication network 1 comprises an IGW 12 logically located at the SGi interface and able to communicate with a service client in the radio device 4 over the I1 interface, as well as able to prompt the PCRF 11 to install TFT(s) in the PGW, and consequently indirectly also in the radio device 4. The IGW 12 may be connected to the PCRF via an Application Function (AF, not shown) in communication with the IGW, or the IGW 12 may act as an AF, able to communicate with the PCRF directly, for installing the TFTs in the PGW.

The radio device 4 may be any device or user equipment (UE), mobile or stationary, enabled to communicate over a radio channel in a communication network 1, for instance but not limited to e.g. mobile phone, smart phone, modem, sensors, meters, vehicles (e.g. a car), household appliances, medical appliances, media players, cameras, or any type of consumer electronic, for instance but not limited to television, radio, lighting arrangements, tablet computer, laptop, or personal computer (PC).

Figure 1:
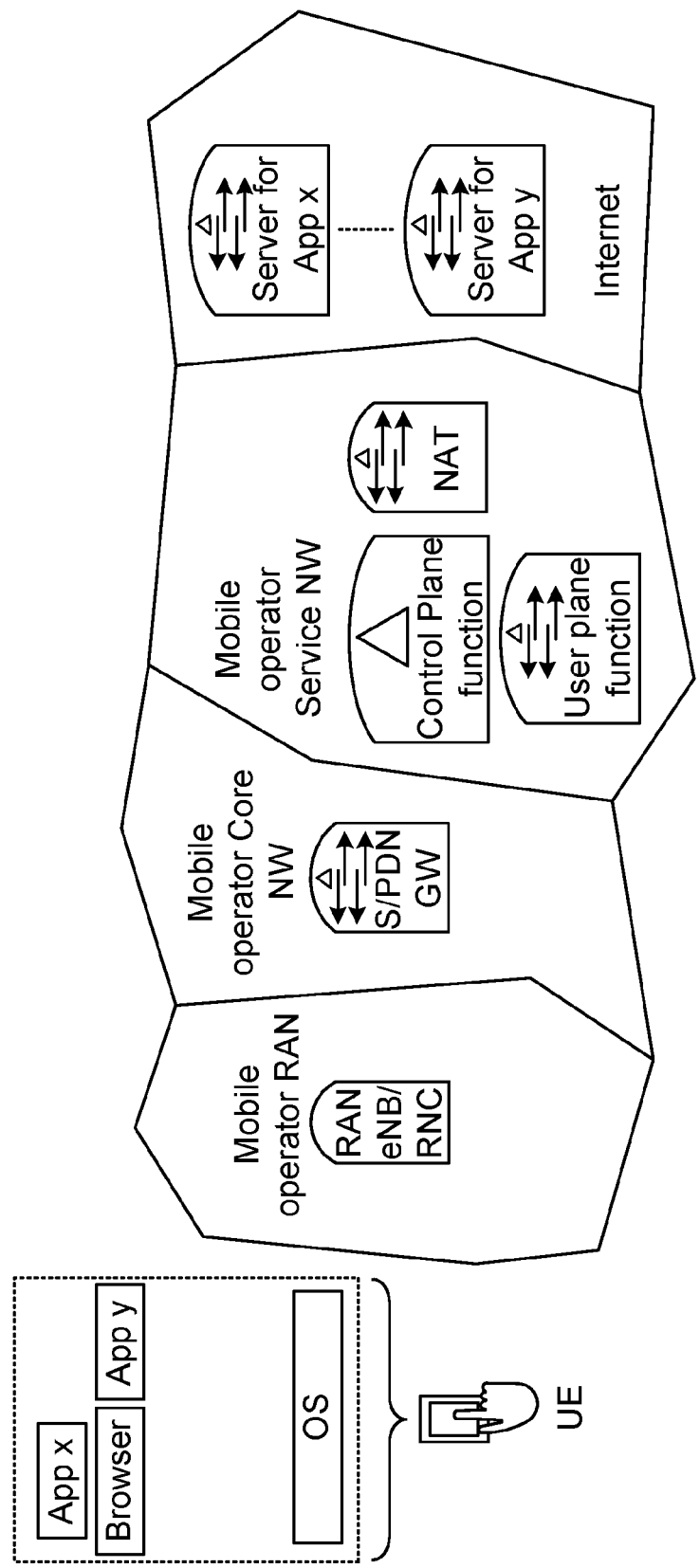
FIG. 1 is a schematic overview of a standard 3GPP communication network.
Figure 2:
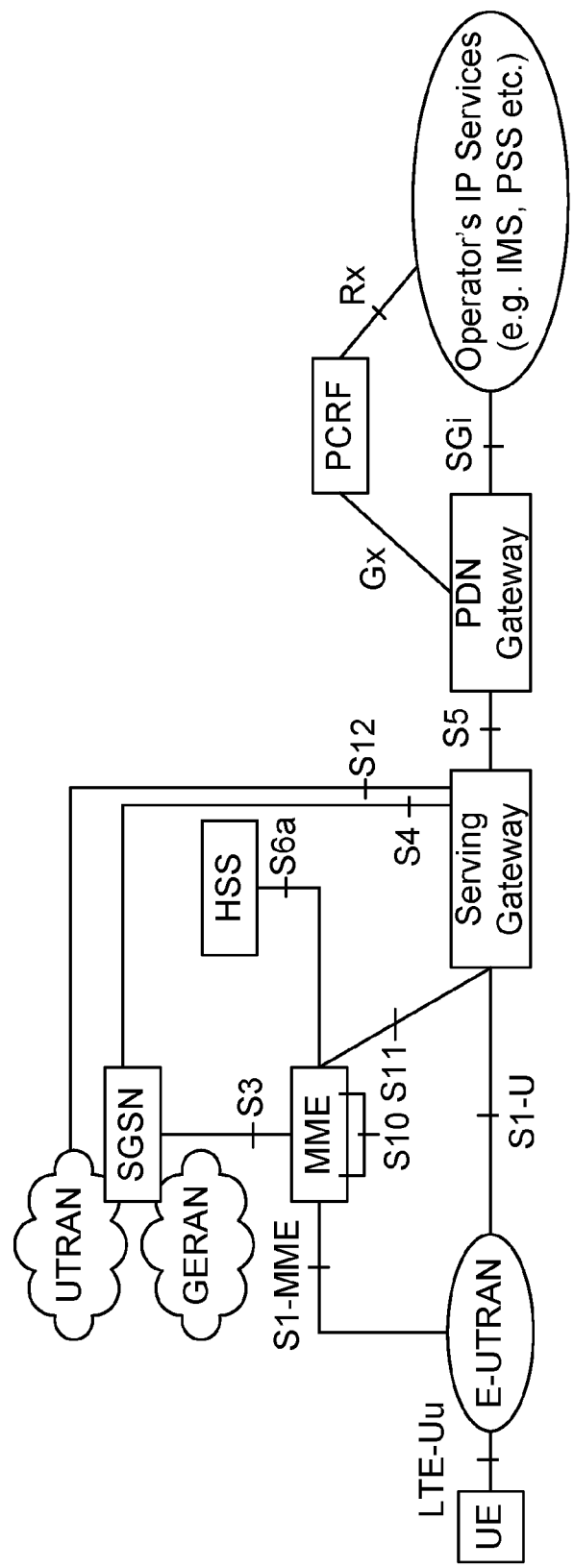
FIG. 2 is another, more detailed, schematic block diagram overview of a standard 3GPP communication network.
Figure 3:
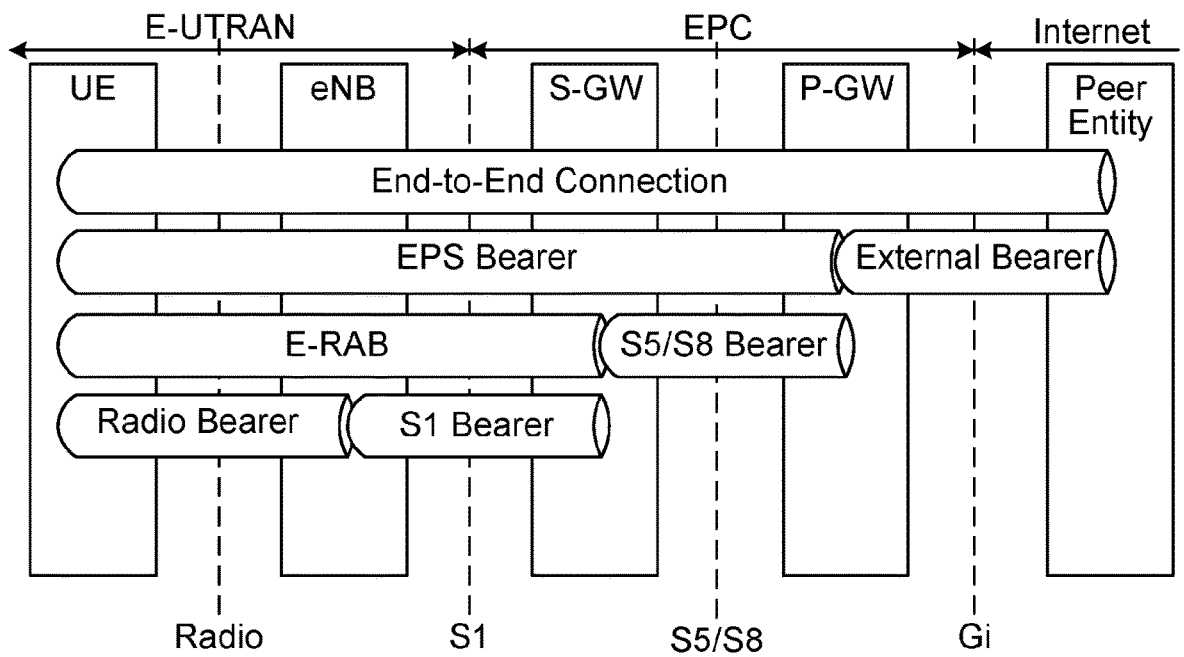
FIG. 3 is a schematic diagram illustrating the different bearer types in accordance with EPC.
Figure 4:
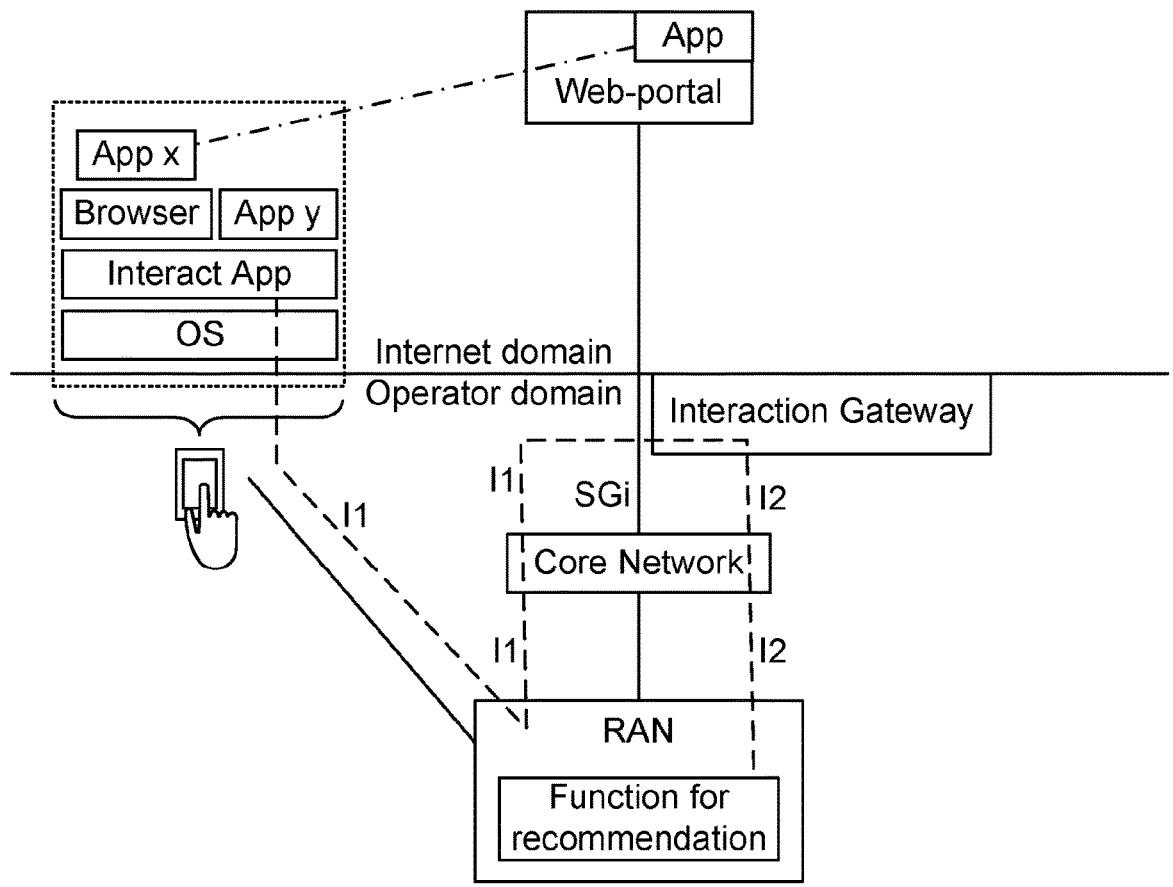
FIG. 4 is a schematic block diagram illustrating a positioning of an IGW as well as interfaces I1 and I2 to said IGW, in accordance with the present disclosure.
Figure 6:
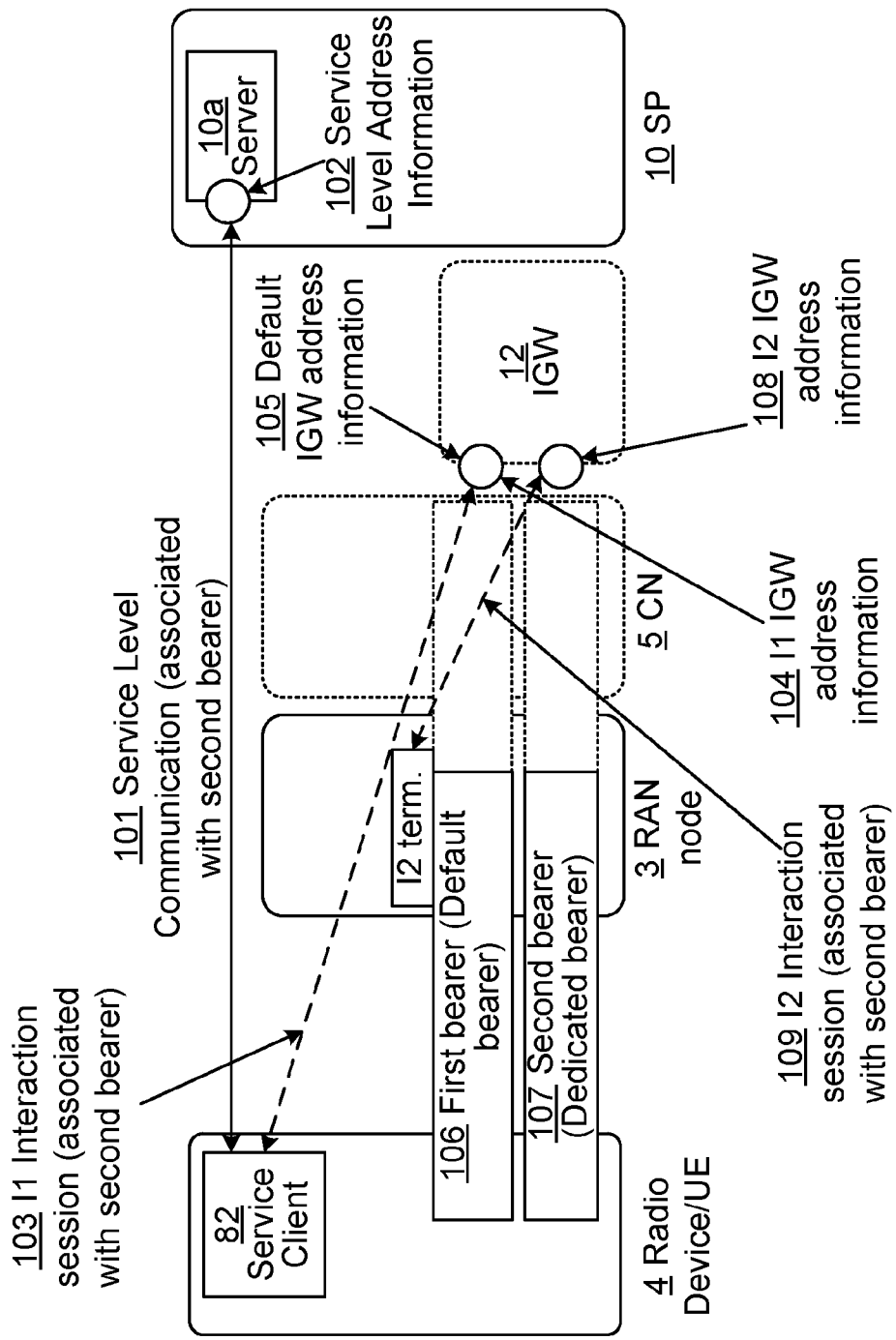
FIG. 6 is a schematic block diagram illustrating embodiments of the present disclosure.

FIG. 6 schematically illustrates some signalling between different nodes in the communication network 1, in accordance with the present disclosure, and also illustrates the terminology used in the present disclosure. A first (default) bearer 106 and a second (dedicated) bearer 107 are set up between the radio device 4 and the CN 5 (PGW 8) via the RAN node 3. However, since messages relating to the I1 (first) interaction session 103 are addressed to the IGW 12, by means of the default I1 session IGW address information 105 (on the default bearer 106) or the first/I1 dedicated session IGW address information 104 (on the dedicated bearer 107), these messages are picked up by the IGW 12. The service level communication 101 from/to the service client 82 in the radio device 4 is addressed by means of the service level address information 102, e.g. IP addresses or domain names (Domain Name System, DNS) of one or more server 10a of the SP 10. The I1 (first) interaction session 103 from the service client 82 is set up to the IGW 12 by means of the initialization message with the default IGW address information 105 on the default bearer 106. Then, the interaction session uses the dedicated I1 session IGW address information 104 on the dedicated bearer 107. Similarly, if an I2 (also called second) session 109 is set up between the IGW 12 and the RAN node 3 (terminating at an I2 termination e.g. the "Function for Recommendation" as shown in FIG. 4), the I2 session 109 is set up by the IGW in response to the initialization message. Second dedicated IGW address information 108 for the I2 session 109 is used on the dedicated bearer 107.

Figure 7A:
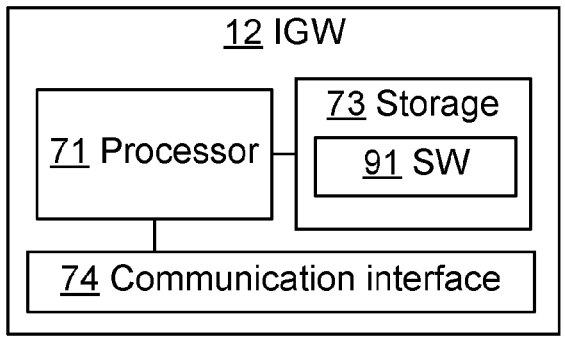
FIG. 7*a* is a schematic block diagram of an embodiment of an IGW in accordance with the present disclosure.

FIG. 7a schematically illustrates an embodiment of an IGW 12 of the present disclosure. The IGW12 comprises processor circuitry 71 e.g. a central processing unit (CPU). The processor circuitry 71 may comprise one or a plurality of processing units in the form of microprocessor(s). However, other suitable devices with computing capabilities could be comprised in the processor circuitry 71, e.g. an application specific integrated circuit (ASIC), a field programmable gate array (FPGA) or a complex programmable logic device (CPLD). The processor circuitry 71 is configured to run one or several computer program(s) or software (SW) 91 (see also FIG. 9) stored in a storage 73 of one or several storage unit(s) e.g. a memory, e.g. a computer program for performing a method of the present disclosure. The storage unit is regarded as a computer readable means 93 (see FIG. 9) as discussed herein and may e.g. be in the form of a Random Access Memory (RAM), a Flash memory or other solid state memory, or a hard disk, or be a combination thereof. The processor circuitry 71 may also be configured to store data in the storage 73, as needed. The IGW 12 also comprises a communication interface 74 for communication with other nodes in the communication network 1 as well as with the radio device over the I1 interface and, optionally, with the RAN 2 over the I2 interface. The communication interface comprises a transmitter and a receiver, which may be combined into a transceiver.

According to an aspect of the present disclosure, there is provided an IGW 12 configured for being located between a PDN 9 and a user plane gateway, e.g. PGW, 8 of a communication network 1 used by a service client 82 for service level communication 101 with a service provider 10, in which communication network there is a first and a second communication bearer 106 and 107 between a radio device 4, comprising the service client, and the user plane gateway, e.g. PGW, 8 via a RAN 2 where the second communication bearer 107 is associated with the service level communication, for establishing a first interaction session 103 on the second communication bearer between the IGW and the service client for controlling the service level communication. The IGW comprises processor circuitry 71, and storage 73 storing instructions 91 executable by said processor circuitry whereby said IGW is operative to obtain an initialization message addressed to the IGW 12 by means of default IGW address information 105 via the first bearer 106, for initiating the first interaction session 103, the initialization message comprising service level address information 102 used for the service level communication 101. The IGW is also operative to determine first dedicated IGW address information 104 for the first interaction session 103. The IGW is also operative to initiate sending of a confirmation message comprising the determined first dedicated IGW address information 104 to the service client 82. The IGW is also operative to ensure that the first interaction session 103, using the first dedicated IGW address information 104, is associated with the second communication bearer 107. The IGW may in some embodiments also be operative to obtain an interaction session message addressed to the IGW 12 by means of the determined first dedicated IGW address information 104 on the second communication bearer 107. The IGW may in some embodiments also be operative to initiate sending a response to the interaction session message, to the service client 82 in the radio device 4 via the second bearer 107.

Figure 7B:
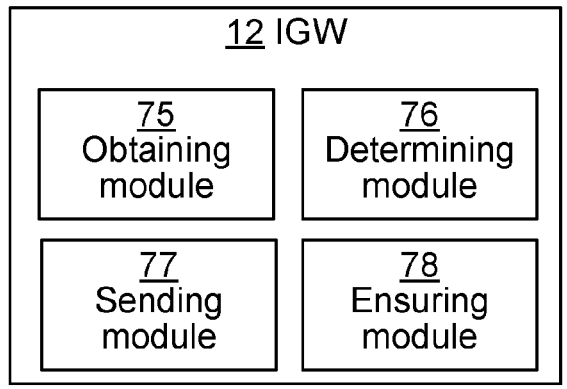
FIG. 7*b* is a schematic functional block diagram of another embodiment of an IGW in accordance with the present disclosure.

FIG. 7b is a schematic block diagram functionally illustrating an embodiment of the IGW 12 in FIG. 7a. As previously mentioned, the processor circuitry 71 may run software 91 for enabling the IGW 12 to perform an embodiment of a method of the present disclosure, whereby functional modules may be formed in IGW 12 e.g. in the processor circuitry 71 for performing the different steps of the method. These modules are schematically illustrated as blocks within the IGW. Thus, the IGW comprises an obtaining module 75 for obtaining (e.g. receiving) the initialization message addressed to the IGW 12 by means of default IGW address information 105 via the first bearer 106, for initiating the first interaction session 103, wherein the initialization message comprises service level address information 102 used for the service level communication 101. The IGW also comprises a determining module 76 for determining first dedicated IGW address information 104 for the first interaction session 103. The IGW also comprises a sending module 77 for initiating sending of a confirmation message comprising the determined first dedicated IGW address information 104 to the service client 82. The IGW also comprises an ensuring module 78 for ensuring that the first interaction session 103, using the first dedicated IGW address information 104, is associated with the second communication bearer 107. The obtaining module 75 may also be used for obtaining (e.g. receiving) the interaction session message addressed to the IGW 12 by means of the determined first dedicated IGW address information 104 on the second communication bearer 107. The sending module 77 may also be used for initiating sending, e.g. sending, the response to the interaction session message, to the service client 82 in the radio device 4 via the second bearer 107. Alternatively, the modules 75-78 may be formed by hardware, or by a combination of software and hardware.

According to an aspect of the present disclosure, there is provided an IGW 12 configured for being located between a PDN 9 and a user plane gateway 8 of a communication network 1 used by a service client 82 for service level communication 101 with a service provider 10, in which communication network there is a first and a second communication bearer 106 and 107 between a radio device 4, comprising the service client, and the user plane gateway 8 via a RAN 2 where the second communication bearer 107 is associated with the service level communication, for establishing a first interaction session 103 on the second communication bearer between the IGW and the service client for controlling the service level communication. The IGW comprises means 75 for obtaining, e.g. receiving, an initialization message addressed to the IGW 12 by means of default IGW address information 105 via the first bearer 106, for initiating the first interaction session 103, the initialization message comprising service level address information 102 used for the service level communication 101. The IGW also comprises means 76 for determining first dedicated IGW address information 104 for the first interaction session 103. The IGW also comprises means 77 for initiating sending, e.g. sending, of a confirmation message comprising the determined first dedicated IGW address information 104 to the service client 82. The IGW also comprises means 78 for ensuring that the first interaction session 103, using the first dedicated IGW address information 104, is associated with the second communication bearer 107. The IGW may in some embodiments also comprise means 75 for obtaining, e.g. receiving, an interaction session message addressed to the IGW by means of the determined first dedicated IGW address information 104 on the second communication bearer 107. The IGW may in some embodiments also comprise means 77 for initiating sending, e.g. sending, a response to the interaction session message, to the service client 82 in the radio device 4 via the second bearer 107.

Figure 8A:
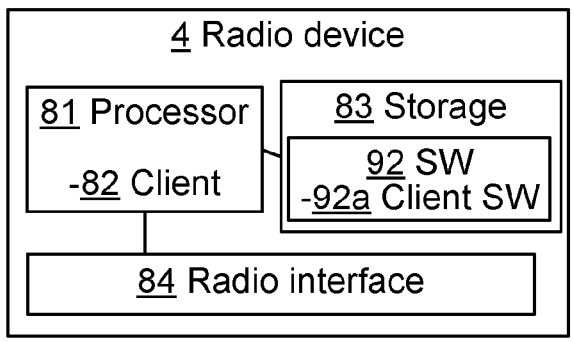
FIG. 8*a* is a schematic block diagram of an embodiment of a radio device in accordance with the present disclosure.

FIG. 8a schematically illustrates an embodiment of a radio device 4 of the present disclosure. The radio device 4 comprises processor circuitry 81 e.g. a central processing unit (CPU). The processor circuitry 81 may comprise one or a plurality of processing units in the form of microprocessor(s). However, other suitable devices with computing capabilities could be comprised in the processor circuitry 81, e.g. an application specific integrated circuit (ASIC), a field programmable gate array (FPGA) or a complex programmable logic device (CPLD). The processor circuitry 81 is configured to run one or several computer program(s) or software (SW) 92 (see also FIG. 9) stored in a storage 83 of one or several storage unit(s) e.g. a memory. Thus, the service client 82 (e.g. a service application, an app) may be formed in the processor circuitry 81 by client SW 92a stored in the storage 83 running on the processor circuitry 81. The storage unit is regarded as a computer readable means 93 (see FIG. 9) as discussed herein and may e.g. be in the form of a Random Access Memory (RAM), a Flash memory or other solid state memory, or a hard disk, or be a combination thereof. The processor circuitry 81 may also be configured to store data in the storage 83, as needed. The radio device 4 also comprises a radio communication interface 84 for communication with/via the communication network 1 e.g. via the RAN node 3. Specifically, the communication network may be used for communicating with the IGW 12 over the I1 interface in an I1 session via the RAN 2. The radio interface comprises a transmitter and a receiver, which may be combined into a transceiver, as well as an antenna for radio communication.

According to an aspect of the present disclosure, there is provided a radio device 4. The radio device is configured for being connected to a RAN 2 of a communication network 1 in which there is a first and a second communication bearer 106 and 107 between the radio device and user plane gateway, e.g. PGW, 8 of the communication network via the RAN, where the second communication bearer 107 is associated with a service level communication between a service client 82 in the radio device and a service provider 10. The radio device is also configured for establishing a first interaction session 103 between an IGW 12 and the service client on the second communication bearer for controlling the service level communication, wherein the IGW is (logically) located between a PDN 9 and the user plane gateway. The radio device comprises processor circuitry 81, and storage 83 storing instructions 92 executable by said processor circuitry whereby said radio device is operative to obtain, e.g. receive, first dedicated IGW address information 104 for the interaction session 103. The radio device is also operative to ensure that the first interaction session 103, using the first dedicated IGW address information 104, is associated with the second communication bearer 107.

Figure 8B:
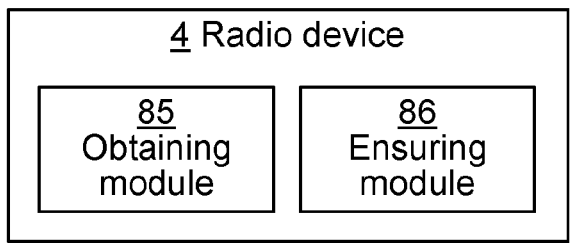
FIG. 8*b* is a schematic functional block diagram of an embodiment of a radio device in accordance with the present disclosure.

FIG. 8b is a schematic block diagram functionally illustrating an embodiment of the radio device 4 in FIG. 8a. As previously mentioned, the processor circuitry 81 may run software 92 for enabling the radio device 4 to perform an embodiment of a method of the present disclosure, whereby functional modules may be formed in the radio device 4 e.g. in the processor circuitry 81 for performing the different steps of the method. These modules are schematically illustrated as blocks within the radio device 4. Thus, the radio device 4 comprises an obtaining module 85 for obtaining, e.g. receiving, first dedicated IGW address information 104 for the first interaction session 103. The radio device also comprises an ensuring module 86 for ensuring that the first interaction session 103, using the first dedicated IGW address information 104, is associated with the second communication bearer 107.

Alternatively, the modules may be formed by hardware, or by a combination of software and hardware.

According to an aspect of the present disclosure, there is provided a radio device 4. The radio device is configured for being connected to a RAN 2 of a communication network 1 in which there is a first and a second communication bearer 106 and 107 between the radio device and user plane gateway, e.g. PGW, 8 of the communication network via the RAN, where the second communication bearer 107 is associated with a service level communication between a service client 82 in the radio device and a service provider 10. The radio device is also configured for establishing a first interaction session 103 between an IGW 12 and the service client on the second communication bearer for controlling the service level communication, wherein the IGW is (logically) located between a PDN 9 and the user plane gateway. The radio device comprises means 85 for obtaining, e.g. receiving, first dedicated IGW address information 104 for the first interaction session 103. The radio device also comprises means 86 for ensuring that the first interaction session 103, using the first dedicated IGW address information 104, is associated with the second communication bearer 107.

Figure 9:
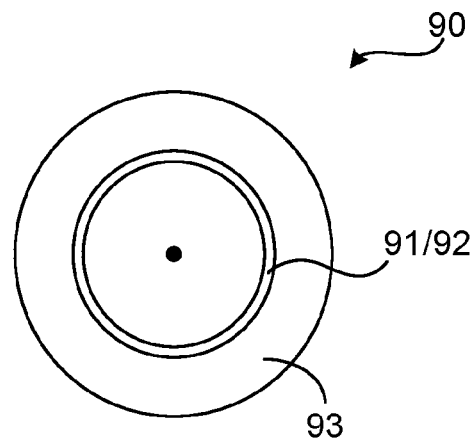
FIG. 9 is a schematic illustration of an embodiment of a computer program product in accordance with the present disclosure.

FIG. 9 illustrates a computer program product 90. The computer program product 90 comprises a computer readable (e.g. non-volatile and/or non-transitory) medium 93 comprising a computer program 91 and/or 92 in the form of computer-executable components. The computer program 91/92 may be configured to cause an IGW 12 or a radio device 4, e.g. as discussed herein, to perform an embodiment of a method of the present disclosure. The computer program may be run on the processor circuitry 71/81 of the IGW 12/radio device 4 for causing it to perform the method. The computer program product 90 may e.g. be comprised in a storage unit or memory 73/83 comprised in the IGW 12/radio device 4 and associated with the processor circuitry 71/81. Alternatively, the computer program product 90 may be, or be part of, a separate, e.g. mobile, storage means/ medium, such as a computer readable disc, e.g. CD or DVD or hard disc/drive, or a solid state storage medium, e.g. a RAM or Flash memory. Further examples of the storage medium 93 can include, but are not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Embodiments of the present disclosure may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

According to an aspect of the present disclosure, there is provided a computer program product 90 comprising computer-executable components 91 or 92 for causing an IGW 12 or a radio device 4 to perform an embodiment of a method of the present disclosure when the computer-executable components are run on processor circuitry 71/81 comprised in the IGW/radio device.

According to another aspect of the present disclosure, there is provided a computer program 91 for establishing a first interaction session 103 between an IGW 72 and a service client 82 of a radio device 4 for controlling service level communication 101 between the service client 82 and a service provider 10, wherein there is a first and a second communication bearer 106 and 107 between the radio device and a user plane gateway 8 via a RAN 2, where the second communication bearer 107 is associated with the service level communication, wherein the IGW is located between a PDN 9 and the user plane gateway 8. The computer program comprises computer program code which is able to, when run on processor circuitry 71 of the IGW, cause the IGW to obtain an initialization message addressed to the IGW 12 by means of default IGW address information 105 via the first bearer 1o6, for initiating the first interaction session 103. The initialization message comprises service level address information 102 used for the service level communication 101. The code is also able to cause the IGW to determine first dedicated IGW address information 104 for the interaction session 103. The code is also able to initiate sending of a confirmation message comprising the first determined dedicated IGW address information 104 to the service client 82. The code is also able to cause the IGW to ensure that the first interaction session 103, using the first dedicated IGW address information 104, is associated with the second communication bearer 107. The code may also able to cause the IGW to obtain an interaction session message addressed to the IGW 12 by means of the first determined dedicated IGW address information 104 and associated with the service level communication 10o1, on the second communication bearer 107. The code may also able to cause the IGW to initiate sending a response to the interaction session message, to the service client 82 in the radio device 4 via the second bearer 107.

According to another aspect of the present disclosure, there is provided a computer program 92 for establishing a first interaction session 103 between an IGW 12 and service client 82 of a radio device 4 for controlling service level communication 101 between the service client 82 and a service provider 1o, wherein there is a first and a second communication bearer 106 and 107 between the radio device and a user plane gateway 8 via a RAN 2, where the second communication bearer 107 is associated with the service level communication, wherein the IGW is located between a PDN 9 and the user plane gateway 8. The computer program comprises computer program code which is able to, when run on processor circuitry 81 of the radio device, cause the radio device to obtain first dedicated IGW address information 104 for the first interaction session 103. The code is also able to cause the radio device to ensure that the first interaction session 103, using the first dedicated IGW address information 104, is associated with the second communication bearer 107.

According to another aspect of the present disclosure, there is provided a computer program product 90 comprising an embodiment of a computer program 91/92 of the present disclosure and a computer readable means 93 on which the computer program is stored.

Figure 10A:
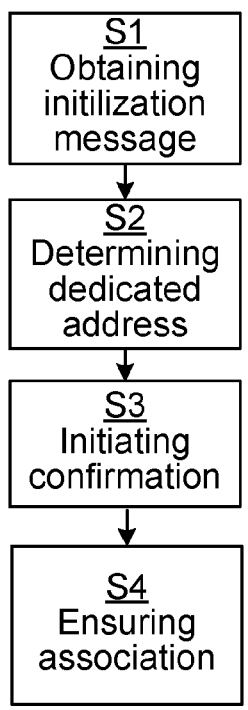
FIG. 10*a* is a schematic flow chart of an embodiment of a method performed in the IGW in accordance with the present disclosure.

FIG. 10*a* is a schematic flow chart of an embodiment of the method performed in the IGW 12.

The method is performed in an IGW 12 located between a PDN 9 and a user plane gateway, e.g. PGW, 8 of a communication network 1 used by a service client 82 for service level communication 101 with a service provider 10, in which communication network there is a first and a second communication bearer 106 and 107 between a radio device 4, comprising the service client, and the user plane gateway 8 of a CN 5 of the communication network via a RAN 2. The second communication bearer 107 is associated with the service level communication, for establishing a first interaction session 103 on the second communication bearer between the IGW and the service client for controlling the service level communication.

Logically, the IGW 12 is "above" the user plane gateway, e.g. PGW, 8. The IGW may be located in the same node or other physical unit. If the IGW is co-located with the PGW, then the IGW is physically part of the EPC but not necessarily functionally. An Rx-interface of the IGW towards PCRF 11 indicates the relation of the IGW to the CN 5 but the IGW may in principle be part of the mobile network or operated by another entity that has agreement with the mobile network to e.g. allow the usage of the Rx-interface. The IGW may not be bearer aware, and it doesn't have to be thanks to the service level address information 102 that the IGW receives from the radio device. The IGW selects address information 104 and 108 for both I1 and I2 sessions 103 and 109 and uses the service level address information 102 towards the PCRF 11 to ensure that the I1 and I2 address information is added as TFTs for the same dedicated bearer 107 that the service level address information is associated with. The I1 messages of the first interaction session 103 (herein also called I1 session and the like) find their way to the IGW by means of routing on the IGW IP address to the IGW. Destination address of I1 messages is the IGW IP or IP1 addresses as discussed herein.

The IGW obtains S1, e.g. receives, an initialization message 121 addressed to the IGW (13) by means of default IGW address information 105 via the first bearer 106, for initiating the first interaction session 103. The initialization message comprises service level address information 102 used for the service level communication 101.

Then, the IGW determines S2 first dedicated IGW address information 104 (herein also called I1 address information, and may comprise the IGW IP1 address) for the first interaction session 103. In some embodiments, if a second interaction session 109 over the I2 interface is to be set up, the IGW may in this step also determine second dedicated address information 108 (herein also called I2 address information, and may comprise the IGW IP2 address) for the second interaction session 109.

The IGW initiates S3 sending of, e.g. sends, a confirmation message 122 comprising the determined S2 first dedicated IGW address information 104 to the service client 82.

Before or after the initiating S3, the IGW 12 ensures S4 that the first interaction session 103, using the first dedicated IGW address information 104, is associated with the second communication bearer 107. In some embodiments, if a second interaction session 109 over the I2 interface is to be set up, the IGW may in this step also ensure that the second interaction session 109, using the second dedicated IGW address information 108, is associated with the second communication bearer 107 used for the service level communication 101. The IGW may be able to communicate directly with the PCRF 11 using an Rx interface. In some embodiments, there may be an intermediate AF between the IGW and the PCRF.

Figure 12:
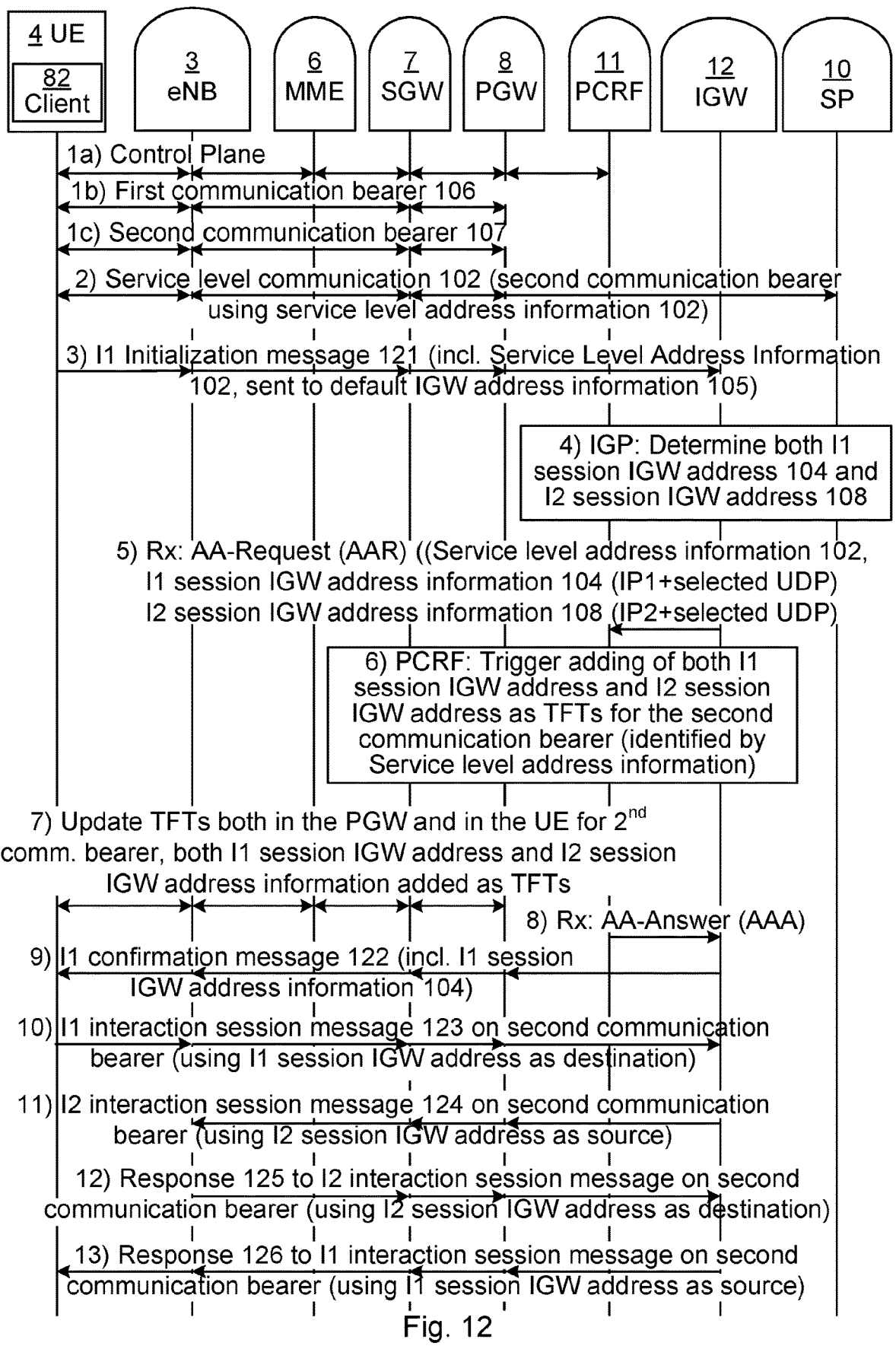
FIG. 12 is a schematic signalling diagram illustrating example embodiments of the present disclosure.

Then, when the first interaction session 103 has thus been set up, the IGW 12 may obtain, e.g. receive, an interaction session message 123 (FIG. 12) addressed to the IGW 12 by means of the determined S2 first dedicated IGW address information 104 on the second communication bearer 107. In some embodiments, the IGW may then send a second interaction session message 124 (FIG. 12) comprising the second dedicated IGW address information 108 (e.g. as source address) towards the radio device 4 on the second communication bearer 107, which may be obtained by the RAN 2 and which may inform the RAN about the interaction session message 123 (FIG. 12). The RAN 2 may then respond to the second interaction session message 124 (FIG. 12) with a second interaction session response 125 (FIG. 12) to the IGW as part of the second interaction session 109 with the second dedicated IGW address information 108 (e.g. as destination address) on the second communication bearer 107.

The IGW may also, in some embodiments, initiate sending, e.g. send, a response 126 (FIG. 12) to the interaction session message 123, to the service client 82 in the radio device 4 via the second bearer 107. In some embodiments, this response 126 is based on the response 125 to the second interaction session message 124 received from the RAN 2 as part of the second interaction session 109.

In some embodiments, the method is also for establishing the second interaction session 109 between the IGW 12 and the RAN 2. The step of determining S2 may then also comprise determining second dedicated IGW address information 108 for the second interaction session 109. The step of ensuring S4 may then also comprise ensuring that the second interaction session 109, using the second dedicated IGW address information 108, is associated with the second communication bearer 107 used for the service level communication 101. The method may then further comprise initiating sending, e.g. sending, a second interaction session message to the RAN 2 via the second bearer by means of the determined S2 second dedicated IGW address information 108; and obtaining, e.g. receiving, a response to the second interaction session message addressed to the IGW 12 by means of the determined S2 second dedicated IGW address information 108 from the RAN 2 on the second communication bearer 107. By means of the first and second interaction sessions 103 and 109, over the I1 and I2 interfaces, respectively, a combined interaction session between the service client 82 and the RAN 2 in user plane is obtained, in which e.g. control signalling relating to the traffic on the second (dedicated) bearer 107 may be transmitted on said second bearer. In the first interaction session 103, the signalling may be between the service client and the IGW 12, transparently passing through the RAN 2, while the second interaction session 109 is between the IGW and the RAN, whereby messages/information may be sent between the RAN and the service client forwarded by the IGW.

Figure 10B:
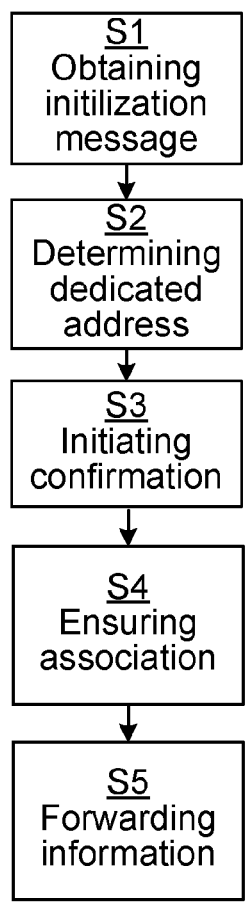
FIG. 10*b* is a schematic flow chart of an embodiment of a method performed in the IGW in accordance with the present disclosure.

Thus, as illustrated in FIG. 10*b*, the IGW 12 may forward S5 messages, or information in messages, between the first (I1) and second (I2) interaction sessions 103 and 109, e.g. forming a combined interaction session between the service client 82 and the RAN 2. In some embodiments, the IGW 12 forwards S5 information received in the first interaction session 103 to the RAN 2 in the second interaction session 109. Additionally or alternatively, in some embodiments, the IGW forwards S5 information received in the second interaction session 109 to the service client 82 in the first interaction session 103. The forwarded information may be related to the service level communication 101 via the second bearer 107, e.g. control signalling therefore such as relating to variable bit rate or the like.

The forwarded S5 information may e.g. be received in an I1 interaction session message 123 (FIG. 12) of the first interaction session 103, and forwarded S5 in an I2 interaction session message 124 (FIG. 12). Additionally or alternatively, forwarded information may be received in an I2 interaction session response 125 (FIG. 12), and forwarded S5 in an I1 interaction session response 126 (FIG. 12).

In some embodiments, the ensuring S4 comprises initiating sending a message comprising the determined S2 first dedicated IGW address information 103 as well as the service level address information 102 to a PCRF 11 or to an AF for initiating setting up of a filter, e.g. a TFT, in the radio device 4 and/or in the CN 5 of the communication network 1 for mapping IP data packets associated with the determined S2 first dedicated IGW address information 104 to the second communication bearer 107.

Additionally or alternatively, if a second interaction session 109 has been established, the ensuring S4 may comprise initiating sending a message comprising the determined S2 second dedicated IGW address information 108 as well as the service level address information 102 to a PCRF 11 or to an AF for initiating setting up of a filter, e.g. a TFT, in the CN 5 of the communication network 1 for mapping IP data packets associated with the determined S2 second dedicated IGW address information 108 to the second communication bearer 107.

Figure 11:
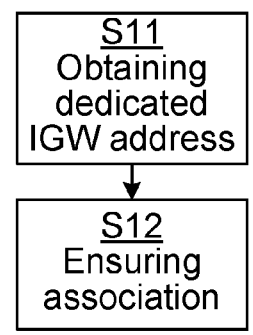
FIG. 11 is a schematic flow chart of an embodiment of a method performed in the radio device in accordance with the present disclosure.

FIG. 11 is a schematic flow chart of an embodiment of the method performed in the radio device 4. The radio device 4 comprises a service client 82 configured for service level communication 101 with a service provider 10. The radio device is connected to a RAN 2 of a communication network 1 in which there is a first and a second communication bearer 106 and 107 between the radio device and a user plane gateway, e.g. PGW, 8 of the communication network via the RAN, where the second communication bearer 107 is associated with the service level communication. The method is for establishing a first interaction session 103 between an IGW 12 and the service client in the radio device on the second communication bearer for controlling the service level communication. The IGW is located between a PDN 9 and the user plane gateway 8. The method comprises obtaining S11, e.g. receiving, first dedicated IGW address information 104 for the first interaction session 103. The method also comprises ensuring S12 that the first interaction session 103, which uses the first dedicated IGW address information 104, is associated with the second communication bearer 107.

The ensuring S12 may, at least in part, take place before, after and/or during the obtaining S11.

In some embodiments, the obtaining S11 comprises sending an initialization message addressed to the IGW 12 by means of default IGW address information 105 on the first communication bearer 106, for initiating the interaction session 103, and receiving a confirmation message from the IGW 12. The confirmation message comprises the first dedicated IGW address information 104 for the first interaction session. In some embodiments, the ensuring S12 comprises including the service level address information 102 in the initialization message.

In some embodiments, the ensuring S12 comprises updating a filter, e.g. a TFT, for the second communication bearer 107 with the first dedicated IGW address information 104.

A general assumption in the present disclosure is that there exists a first (default) bearer 106 and at least one second (dedicated) bearer 107 for the radio device 4. The dedicated bearer is used for the Service Level Communication 101 for which the service client 82 in the radio device 4 is about to establish the I1 session. The described methods may also function in the case when the radio device has multiple dedicated bearers for different services and a separate I1 session is to be established for each service.

When a second (dedicated) bearer is established and the client 82 wishes to interact over the I1 interface, the client sends an I1 Initialization message on the first (default) bearer addressed to the I1 initial IGW address of the default IGW address information 105. The default IGW address information 105 may comprise of both an IGW IP address and an UDP port known to the radio device 4 (any UDP port number could be used). The I1 Initialization message also contains the service level address information 102. When the client in the radio device sends this message, the lower layers in the radio device will send the message on the default bearer 106 since the destination IP (the I1 initial IGW address) is not part of any TFT for a dedicated bearer 107. When the IGW receives this message it may select both I1 session IGW address information 104 and I2 session IGW address information 108 for the I1 and I2 sessions 103 and 109, for example IGW IP1 for I1 session 103 and IGW IP2 for I2 session 109, and a common UDP port for both sessions.

A next step is then to add two TFTs for the I1 session IGW address information 104 and I2 session IGW address information 108 for the second bearer 107 identified by the Service Level Address information 102. This results in that the bearer handling in the radio device 4 sends uplink I1 session packets with I1 session IGW address on the correct dedicated bearer, i.e. the bearer for the related service. In addition, the bearer handling in the PGW 8 will send downlink I2 session packets with I2 session IGW address to the correct dedicated bearer, i.e. the bearer for the related service. The PGW will also send downlink I1 session packets with I1 session IGW address to the correct dedicated bearer, i.e. the bearer for the related service.

The IGW 12 returns the I1 session IGW address to the client with an I1 Confirmation message, if service interaction is supported and accepted. In this example, the IGW selects the UDP port.

The IGW/SAP could interact with an Application function (AF) to install the TFTs, and the AF would then signal towards the PCRF. FIG. 13 shows the case when the IGW/SAP is acting as the AF towards the PCRF.

In some embodiments of the present disclosure, the first communication bearer 106 is a default bearer and the second communication bearer 107 is a dedicated bearer.

In some embodiments of the present disclosure, the first and second communication bearers 106 and 107 are EPS bearers or Packed Data Protocol (PDP) contexts.

FIG. 12 shows a simplified communication network 1 for LTE. For example the CN nodes used for control plane signalling, such as the MME 6 in case of LTE may be replaced with a Serving GPRS support node (SGSN) in case of Wideband Code Division Multiple Access (WCDMA). The RAN 2 is exemplified with an eNB 3, however could alternatively be an other RAN node, such as an RNC. Also, the functional entity IGW 12 of the present disclosure, which may act as an AF in this context using the Rx interface towards the PCRF, is shown. The IGW could instead interact with an AF to install the TFTs, and the AF would then signal towards the PCRF 11. FIG. 12 shows the case when the IGW itself is acting as an AF towards the PCRF.

The sequence of messages/signalling is just an example to illustrate embodiments. The list numbering below relates to the step numbers in FIG. 12.

1) In the initial situation in which embodiments of the methods of the present disclosure may be used there are two user plane bearers active for the radio device 4. A default (first) bearer 106 of step 1*b* and a dedicated (second) bearer 107 of step 1*c*. The dedicated bearer is established for a service session to the SP 10. SP 10 may consist of multiple different servers 10*a* each with its own service level address information 102 (e.g. IP-address), for example in the case when the service is available at multiple different servers 10*a* and the radio device 4 selects which of the servers to use based on different criteria. The service level address information 102 may also contain additional information for the CN 5 to be able to identify the correct dedicated bearer for the radio device (such information may consist of for example destination port(s) and/or protocol used). There is also a control plane bearer in step 1*a*.

2) There is also ongoing service level communication 101 via the second bearer 107, using the service level address information 102.

3) The service client 82 in the radio device wishes to initiate I1 interaction for the I1 interaction session 103 on the dedicated bearer 107, and sends an I1 initialization message 121 on the first communication bearer (i.e. the default bearer) 106 using the I1 initial IGW address information 105, for example IGW IP and a well-known UDP-port or any UDP port that the IGW is listening on for the I1 initialization messages (for IGW IP). The client 82 also includes the service level address information 102 in the initialisation message. The initialisation message may also include other information, such as type of service, etc.

4) The IGW 12 receives the I1 initialization message and determines both I1 session IGW address 104 and I2 session IGW address 108 information. The same UDP termination port may be used for both address information but it may also be possible to use different UDP ports for I1 and I2 sessions. IGW IP1 address is used for the I1 session IGW address information and another IGW IP address, IGW IP2, is selected for the I2 session IGW address information. The IGW IP1 could be the same as the initial address IGW IP 105.

5) In this example, the IGW 12 acts as an AF and handles the interaction with the PCRF to add the TFTs related to both the I1 and I2 interaction sessions to the existing dedicated bearer 107 for the service the I1 interaction session relates to. This step comprises the IGW providing information to the PCRF 11 to both identify the radio device 4 in question and to identify the dedicated bearer 107 of the radio device (i.e. by means of the Service Level Address information 102). The TFTs are identified as I1 session IGW address information 104 (i.e. IGW IP1 and selected UDP termination port) and I2 session IGW address information 108 (i.e. IGW IP2 and selected UDP termination port).

6) The PCRF 11 interacts with the packet core nodes, i.e. the PGW 8 (or GGSN for WCDMA) to initiate the new TFTs for the dedicated bearer 107.

7) Standard bearer modification signalling is used to add both UL and DL TFTs for the I1 session IGW address information 104 (e.g. IGW IP1 and selected UDP termination port) and I2 session IGW address information 108 (e.g. IGW IP2 and selected UDP termination port) to the dedicated bearer identified by Service Level Address information 102.

Note that the I1 session IGW address information 104 is added as both an UL TFT in the radio device 4 for destination address information and as a DL TFT in the PGW 8 for source address information, and that the I2 session IGW address information is added as a DL TFT in the PGW for source address information. In addition, the I2 session IGW address information may be added as an UL TFT in the radio device but this TFT may not be used. These installed TFTs ensure that the I1 session signalling using the I1 session IGW address information 104 is always on the dedicated bearer 107, and that the I2 session signalling in downlink is on the same dedicated bearer. The uplink part of the I2 session signalling is put on the dedicated bearer using RAN internal mechanisms.

8) The PCRF 11 replies to the IGW 12 (in its role as an AF) that the request in step 5 has been authorized and performed.

9) The IGW 12 replies to the service client 82 in the radio device 4 with the I1 Confirmation message. This message contains the I1 session IGW address information 104 (e.g. IGW IP1 and selected UDP termination port) to be used for the I1 session.

10) The service client 82 in the radio device 4 sends an I1 interaction session message to the IGW 12 using the I1 session IGW address information 104 (e.g. IGW IP1 and selected UDP termination port) as the destination address and port information. This signalling takes place on the second user plane bearer, i.e. the dedicated bearer, 107 due to the UL TFT installed in the radio device in step 7.

11) The IGW 12 forwards the I1 Interaction session message as an I2 interaction session message 124 to the eNB 3/RAN 2. The I2 message is sent as using the I2 session IGW address information 108 as the source IP address and source UDP-port. This signalling takes place on the second user plane bearer, i.e. the dedicated bearer, 107 due to the DL TFT installed in the PGW 8 in step 7.

12) The eNB 3/RAN 2 replies to the I2 Interaction session message 124 with a response 125 I2 Interaction session message (i.e. this message is sent from the eNB/RAN to the IGW 12). RAN internal functions ensure that this message is sent on the correct dedicated bearer 107, e.g. RAN 2 knows from which bearer it received the previous/first I2 Interaction session message.

13) The IGW 12 replies to the service client 82 in the radio device by sending another I1 interaction session message using the I1 session IGW address information 104 (i.e. IGW IP1 and selected UDP termination port) as the source address and port information. This signalling takes place on the second user plane bearer, i.e. the dedicated bearer, 107 due to the DL TFT installed in the PGW 8 in step 7.

If a second I1 session is initiated by the client 82, it is sent on the default bearer 106 and when a new I1 initiation is detected either the IGW 12 or the eNB 3/RAN 2 selects a second termination port for the second I1 session. Then, the network can ensure that the I1 and/or I2 signalling is directed to the same bearer as the service it relates to in the same way as described above.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method performed in an Interaction Gateway (IGW) located between a Packet Data Network (PDN) and a user plane gateway of a communication network used by a service client of a radio device for service level communication between the service client and a service provider connected to the PDN, in which communication network there is already established a first communication bearer and a second communication bearer between the radio device and the user plane gateway via a Radio Access Network (RAN) where the second communication bearer is associated with the service level communication, the method for establishing a first interaction session via a first interface of the IGW and a second interaction session via a second interface of the IGW, both interaction sessions to be associated with the second communication bearer for controlling the service level communication, the method comprising:

obtaining an initialization message from the service client addressed to the IGW by means of default IGW address information via the first communication bearer, for initiating the first interaction session between the service client and the IGW, the initialization message comprising service level address information related to the service provider used for the service level communication;

determining a first dedicated IGW address information of the IGW for the first interface for the first interaction session and determining a second dedicated IGW address information of the IGW for the second interface, the second interface for initiating the second interaction session between the IGW and the RAN;

initiating sending of a confirmation message comprising the determined first dedicated IGW address information to the service client for conducting the first interaction session between the service client and the IGW via the first interface;

ensuring that the first and second interaction sessions, respectively using the first and second dedicated IGW address information, are associated with each other and the second communication bearer via a traffic flow filter for the second communication bearer; and forwarding one or more of:
  information received in the first interaction session to the RAN in the second interaction session; and
  information received in the second interaction session to the service client in the first interaction session.

2. The method of claim 1, wherein the forwarded information relates to the service level communication.

3. The method of claim 1, wherein the ensuring comprises initiating sending a message comprising the determined second dedicated IGW address information, as well as the service level address information, to a Policy and Charging Rules Function (PCRF) or to an Application Function (AF), for initiating setting up of the traffic flow filter in a Core Network (CN) of the communication network for mapping IP data packets associated with the determined second dedicated IGW address information to the second communication bearer.

4. The method of claim 3, wherein the traffic flow filter is a Traffic Flow Template.

5. The method of claim 1, wherein the ensuring comprises initiating sending a message comprising the determined first dedicated IGW address information, as well as the service level address information, to a Policy and Charging Rules Function (PCRF) or to an Application Function (AF), for initiating setting up of the traffic flow filter in a Core Network (CN) of the communication network for mapping IP data packets associated with the determined first dedicated IGW address information to the second communication bearer.

6. The method of claim 5, wherein the traffic flow filter is a Traffic Flow Template.

7. The method of claim 1, wherein the first communication bearer is a default bearer and the second communication bearer is a dedicated bearer.

8. The method claim 1, wherein the user plane gateway is a PDN gateway (PGW) or a Gateway GPRS Support Node (GSSN).

9. The method of claim 1, wherein the first and second communication bearers are Evolved Packet System (EPS) bearers or Packed Data Protocol (PDP) contexts.

10. An Interaction Gateway (IGW) for being located between a Packet Data Network (PDN) and a user plane gateway of a communication network used by a service client of a radio device for service level communication between the service client and a service provider connected to the PDN, in which communication network there is already established a first communication bearer and a second communication bearer between the radio device and the user plane gateway via a Radio Access Network (RAN) where the second communication bearer is associated with the service level communication, the IGW for establishing a first interaction session via a first interface of the IGW and a second interaction session via a second interface of the IGW, both interaction sessions to be associated with the second communication bearer for controlling the service level communication, the IGW comprising:
  processor circuitry; and
  storage for storing instructions which, when executed by said processor circuitry, instructs said IGW to perform operations to:
    obtain an initialization message from the service client addressed to the IGW by means of default IGW address information via the first communication bearer, for initiating the first interaction session between the service client and the IGW, the initialization message comprising service level address information related to the service provider used for the service level communication;
    determine a first dedicated IGW address information of the IGW for the first interface for the first interaction session and determine a second dedicated IGW address information of the IGW for the second interface, the second interface for initiating the second interaction session between the IGW and the RAN;
    initiate sending of a confirmation message comprising the determined first dedicated IGW address information to the service client for conducting the first interaction session between the service client and the IGW via the first interface;
    ensure that the first and second interaction sessions, respectively using the first and second dedicated IGW address information, are associated with each other and the second communication bearer via a traffic flow filter for the second communication bearer; and
    forward one or more of:
      information received in the first interaction session to the RAN in the second interaction session; and
      information received in the second interaction session to the service client in the first interaction session.

11. A method performed in a radio device, comprising a service client of the radio device configured for service level communication between the service client and a service provider connected to a Packet Data Network (PDN), the radio device connected to a Radio Access Network (RAN) of a communication network, in which there is already established a first communication bearer and a second communication bearer between the radio device and a user plane gateway of the communication network via the RAN, where the second communication bearer is associated with the service level communication, the method for establishing a first interaction session via a first interface of an Interaction Gateway (IGW) and a second interaction session via a second interface of the IGW for controlling the service level communication, wherein the second communication bearer is associated with the service level communication and wherein the IGW is located between the PDN and the user plane gateway, the method comprising:
  sending an initialization message from the service client addressed to the IGW by means of default IGW address information on the first communication bearer, for initiating the first interaction session between the service client and the IGW, wherein the initialization message comprising service level address information related to the service provider used for the service level communication;
  in response to sending the initialization message, receiving a confirmation message from the IGW, comprising a first dedicated IGW address information of the IGW- for the first interface for conducting the first interaction session between the service client and the IGW via the first interface, and a second dedicated IGW address information of the IGW for the second interface for initiating the second interaction session between the IGW and the RAN; and
  ensuring that the first and second interaction sessions, respectively using the first and second dedicated IGW address information, are associated with each other and the second communication bearer via a traffic flow filter for the second communication bearer in order for the IGW to forward one or more of:
    information received in the first interaction session to the RAN in the second interaction session; and
    information received in the second interaction session to the service client in the first interaction session.

12. The method of claim 11, wherein the traffic flow filter is a Traffic Flow Template.

13. A radio device, comprising a service client of the radio device configured for service level communication between the service client and a service provider connected to a Packet Data Network (PDN), the radio device, for being connected to a Radio Access Network (RAN) of a communication network, in which there is already established a first communication bearer and a second communication bearer between the radio device and user plane gateway of the communication network via the RAN, where the second communication bearer is associated with the service level communication between the service client in the radio device and the service provider, and for establishing a first interaction session via a first interface of an Interaction Gateway (IGW) and a second interaction session via a second interface of the IGW, for controlling the service level communication, wherein the second communication bearer is associated with the service level communication and wherein the IGW is located between the PDN and the user plane gateway, the radio device comprising:

processor circuitry; and storage for storing instructions which, when executed by said processor circuitry, instructs said radio device to perform operations to:

send an initialization message from the service client addressed to the IGW by means of default IGW address information on the first communication bearer, for initiating the first interaction session between the service client and the IGW, wherein the initialization message comprising service level address information related to the service provider used for the service level communication;

in response to the initialization message, receive a confirmation message from the IGW, comprising a first dedicated IGW address information of the IGW for the first interface for conducting the first interaction session between the service client and the IGW via the first interface, and a second dedicated IGW address information of the IGW for the second interface for initiating the second interaction session between the IGW and the RAN; and ensure that the first and second interaction sessions, respectively using the first and second dedicated IGW address information, are associated with each other and the second communication bearer via a traffic flow filter for the second communication bearer in order for the IGW to forward one or more of:

information received in the first interaction session to the RAN in the second interaction session; and information received in the second interaction session to the service client in the first interaction session.

14. A non-transitory computer readable storage medium containing computer program code for establishing a first interaction session via a first interface of an Interaction Gateway (IGW) and a second interaction session via a second interface of the IGW, for controlling service level communication between a service client of a radio device and a service provider, wherein there is already established a first communication bearer and a second communication bearer between the radio device and a user plane gateway via a Radio Access Network (RAN), where the second communication bearer is associated with the service level communication, wherein the IGW is located between a Packet Data Network (PDN) and the user plane gateway, wherein the first and second interfaces are to be associated with the second communication bearer, and wherein the computer program code is capable of causing the IGW to perform operations comprising:

obtaining an initialization message from the service client addressed to the IGW by means of default IGW address information via the first communication bearer, for initiating the first interaction session between the service client and the IGW, the initialization message comprising service level address information related to the service provider used for the service level communication;

determining a first dedicated IGW address information of the IGW for the first interface for the interaction session and determining a second dedicated IGW address information of the IGW for the second interface, the second interface for initiating the second interaction session between the IGW and the RAN;

initiating sending of a confirmation message comprising the determined first dedicated IGW address information to the service client for conducting the first interaction session between the service client and the IGW via the first interface;

ensuring that the first and second interaction sessions, respectively using the first and second dedicated IGW address information, are associated with each other and the second communication bearer via a traffic flow filter for the second communication bearer; and forwarding one or more of:

information received in the first interaction session to the RAN in the second interaction session; and information received in the second interaction session to the service client in the first interaction session.

15. A non-transitory computer readable storage medium containing computer program code for establishing a first interaction session via a first interface of an Interaction Gateway (IGW) and a second interaction session via a second interface of the IGW, for controlling service level communication between a service client of a radio device and a service provider, wherein there is already established a first communication bearer and a second communication bearer between the radio device and a user plane gateway via a Radio Access Network (RAN), where the second communication bearer is associated with the service level communication, wherein the IGW is located between a Packet Data Network (PDN) and the user plane gateway, and wherein the computer program code is capable of causing the radio device to perform operations comprising:

sending an initialization message from the service client addressed to the IGW by means of default IGW address information on the first communication bearer, for initiating the interaction session between the service client and the IGW, wherein the initialization message comprising service level address information related to the service provider used for the service level communication;

in response to sending the initialization message, receiving a confirmation message from the IGW, comprising a first dedicated IGW address information of the IGW for the first interface for conducting the first interaction session between the service client and the IGW via the first interface and a second dedicated IGW address information of the IGW for the second interface for initiating the second interaction session between the IGW and the RAN; and ensuring that the first and second interaction sessions, respectively using the first and second dedicated IGW address information, is associated with each other and the second communication bearer via a traffic flow filter for the second communication bearer in order for the IGW to forward:
information received in the first interaction session to the RAN in the second interaction session; and
information received in the second interaction session to the service client in the first interaction session.

* * * * *